(12) United States Patent
Violetta

(10) Patent No.: US 11,241,721 B2
(45) Date of Patent: Feb. 8, 2022

(54) SENSOR CLEANING SYSTEM AND SENSOR CLEANING METHOD FOR VEHICLE

(71) Applicant: TOYOTA MOTOR ENGINEERING & MANUFACTURING NORTH AMERICA, INC., Plano, TX (US)

(72) Inventor: Chase Violetta, Milan, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/601,857

(22) Filed: Oct. 15, 2019

(65) Prior Publication Data

US 2021/0107040 A1    Apr. 15, 2021

(51) Int. Cl.
  *B08B 3/04*    (2006.01)
  *B60S 1/66*    (2006.01)
  *G06T 7/215*   (2017.01)
  *B60S 3/04*    (2006.01)

(52) U.S. Cl.
  CPC .............. *B08B 3/041* (2013.01); *B60S 1/66* (2013.01); *B60S 3/04* (2013.01); *G06T 7/215* (2017.01); *G06T 2207/30252* (2013.01)

(58) Field of Classification Search
  CPC .. B08B 3/041; B08B 3/02; B08B 3/10; B08B 5/02; B08B 13/00; G06T 7/215; G06T 2207/30252; B60S 1/66; B60S 3/04; B60S 1/56; B60S 1/52; B60S 1/54; B60S 1/64; B60S 1/0848; B60S 1/0818; G01S 17/931; G01S 7/497; G01S 2007/4977; G02B 27/0006; B60W 30/09

USPC ........................................................ 134/56 R
  See application file for complete search history.

(56) References Cited

U.S. PATENT DOCUMENTS

| | | |
|---|---|---|
| 9,607,242 B2 | 3/2017 | Lavoie |
| 9,956,941 B2* | 5/2018 | Kiyohara .............. H04N 5/2171 |
| 10,173,646 B1* | 1/2019 | Rice ........................ B60S 1/485 |
| 10,196,047 B1 | 2/2019 | Hansen et al. |
| 10,627,245 B2* | 4/2020 | Schmidt ............. G01C 21/3415 |
| 10,795,377 B2* | 10/2020 | Afrouzi ............... A47L 11/4011 |
| 10,974,699 B2* | 4/2021 | Jansson ..................... B60S 5/00 |
| 11,059,458 B2* | 7/2021 | Frederick ................ B60S 1/026 |
| 2012/0101704 A1* | 4/2012 | Wagner ................. G01S 7/4004 |
| | | 701/96 |

(Continued)

*Primary Examiner* — Nadine G Norton
*Assistant Examiner* — Christopher Remavege
(74) *Attorney, Agent, or Firm* — Haynes and Boone, LLP

(57) ABSTRACT

Systems and methods for cleaning vehicle sensors are disclosed that optimize sensor cleaning fluid usage. An exemplary vehicle sensor cleaning system includes a sensor cleaning fluid delivery system that delivers sensor cleaning fluid to a sensor of a vehicle and a sensor cleaning control system in communication with the sensor cleaning fluid delivery system. The sensor cleaning control system determines a target cleanliness level for the sensor based on sensor cleaning data associated with the sensor. The target cleanliness level is less than a maximum cleanliness level indicating indicates a contaminate-free sensor. The sensor cleaning control system further monitors a cleanliness level of the sensor and initiates a sensor cleaning operation when the cleanliness level of the sensor is less than an operational cleanliness threshold, such that the sensor cleaning fluid delivery system delivers sensor cleaning fluid to the sensor to clean the sensor to the target cleanliness level.

19 Claims, 3 Drawing Sheets

(56) References Cited

U.S. PATENT DOCUMENTS

| | | | |
|---|---|---|---|
| 2015/0032292 A1* | 1/2015 | Stratton | B60S 1/62 |
| | | | 701/2 |
| 2016/0161602 A1 | 6/2016 | Prokhorov | |
| 2016/0282865 A1* | 9/2016 | Shimizu | B60S 1/026 |
| 2017/0369008 A1* | 12/2017 | Carlesimo | B60R 16/0234 |
| 2018/0086316 A1* | 3/2018 | Trebouet | B05B 12/02 |
| 2018/0354469 A1 | 12/2018 | Krishnan | |
| 2019/0064798 A1 | 2/2019 | Anderson | |
| 2019/0092287 A1 | 3/2019 | Leach et al. | |
| 2019/0135239 A1 | 5/2019 | Rice | |
| 2019/0161035 A1* | 5/2019 | Salter | B60S 1/50 |
| 2019/0322245 A1* | 10/2019 | Kline | B60S 1/485 |
| 2020/0001832 A1* | 1/2020 | Deane | B60S 1/52 |
| 2020/0209848 A1* | 7/2020 | Mercep | G07C 5/0841 |
| 2020/0331435 A1* | 10/2020 | Dingli | B60R 1/00 |
| 2020/0406864 A1* | 12/2020 | Sakai | B60S 1/52 |
| 2021/0031727 A1* | 2/2021 | Sakai | B60S 1/485 |
| 2021/0082090 A1* | 3/2021 | Herman | G06T 5/006 |

\* cited by examiner

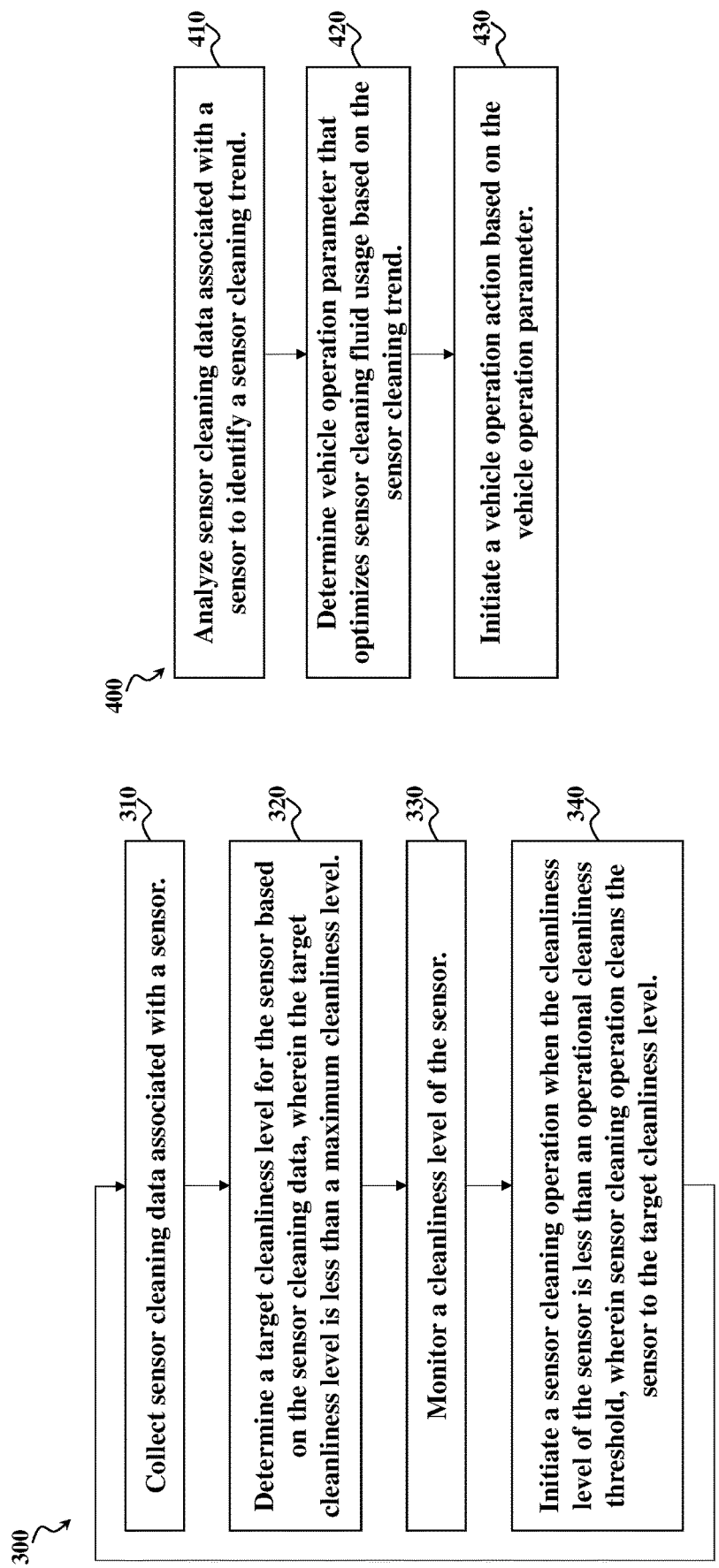

SENSOR CLEANING SYSTEM AND SENSOR CLEANING METHOD FOR VEHICLE

TECHNICAL FIELD

The present disclosure relates generally to vehicle sensors, and more specifically, to systems and methods for cleaning vehicle sensors.

BACKGROUND

Vehicles often execute operations that rely in varying degrees on data obtained by sensors, which provides information about a surrounding and/or external environment of the vehicles. Over the course of normal driving use, sensors accumulate dust, debris, dirt, etc., that gradually degrades the sensors' ability to detect information. Vehicles thus include a sensor cleaning system that automatically cleans the sensors with sensor cleaning fluid when detection degradation reaches and/or falls below a threshold level.

Since sensor data is needed to accurately carry out many vehicle functions, an amount of remaining sensor cleaning fluid can limit how far (for example, a distance) a vehicle can safely travel. Optimizing use of the sensor cleaning fluid can thus improve functioning of the vehicle and extend how far the vehicle can safely travel.

SUMMARY

Systems and methods for cleaning vehicle sensors are disclosed that optimize sensor cleaning fluid usage. An exemplary vehicle sensor cleaning system includes a sensor cleaning fluid delivery system that delivers sensor cleaning fluid to a sensor of a vehicle and a sensor cleaning control system in communication with the sensor cleaning fluid delivery system. The sensor cleaning control system determines a target cleanliness level for the sensor based on sensor cleaning data associated with the sensor. The target cleanliness level is less than a maximum cleanliness level indicating indicates a contaminate-free sensor. The sensor cleaning control system further monitors a cleanliness level of the sensor and initiates a sensor cleaning operation when the cleanliness level of the sensor is less than an operational cleanliness threshold, such that the sensor cleaning fluid delivery system delivers sensor cleaning fluid to the sensor to clean the sensor to the target cleanliness level. In some examples, the sensor cleaning control system determines the target cleanliness level on a per route basis. In some examples, the sensor cleaning control system determines the target cleanliness level on a per weather condition basis. In some examples, the sensor cleaning control system determines the target cleanliness level based on a time period between sensor cleaning operations, an amount of sensor cleaning fluid used per sensor cleaning operation, a type of the sensor, a location of the sensor relative to the vehicle, a location of the sensor relative to an external environment of the vehicle, or combinations thereof.

In some examples, the sensor cleaning control system is configured to correlate sensor cleaning cycle frequency with a trailing distance of the vehicle and determine an optimal trailing distance for reducing sensor cleaning cycle frequency. In some examples, the sensor cleaning control system is configured to generate a notification that includes the optimal trailing distance. In some examples, the sensor cleaning control system is connected to an adaptive cruise control system of the vehicle. In such examples, the sensor cleaning control system is configured to communicate the optimal trailing distance to the adaptive cruise control system, such that the adaptive cruise control system can adjust a current trailing distance of the vehicle to the optimal trailing distance. In some examples, the sensor cleaning control system is configured to determine an amount of sensor cleaning fluid used to clean the sensor on a predetermined travel route and generate a notification when the amount of sensor cleaning fluid is greater than or equal to a threshold amount of sensor cleaning fluid. The notification can recommend operating the vehicle in manual mode.

In some examples, the sensor is a first sensor, the target cleanliness level is a first target cleanliness level, the operational cleanliness threshold is a first operational cleanliness threshold, the sensor cleaning operation is a first sensor cleaning operation, and the vehicle further includes a second sensor. In such examples, the sensor cleaning control system is configured to collect sensor cleaning data associated with the second sensor and determine a second target cleanliness level for the second sensor based on the sensor cleaning data. The second target cleanliness level is less than the maximum cleanliness level and different than the first target cleanliness level. In such examples, the sensor cleaning control system is configured to monitor a cleanliness level of the second sensor and initiate a second sensor cleaning operation when the cleanliness level of the second sensor is less than a second operational cleanliness threshold, wherein the sensor cleaning fluid delivery system delivers sensor cleaning fluid to the second sensor during the second sensor cleaning operation to clean the second sensor to the second target cleanliness level.

An exemplary method for cleaning of a sensor of a vehicle includes collecting sensor cleaning data associated with the sensor and determining a target cleanliness level for the sensor based on the sensor cleaning data. The target cleanliness level is less than a maximum cleanliness level that indicates that the sensor is free of contaminate. The method further includes monitoring a cleanliness level of the sensor and initiating a sensor cleaning operation when the cleanliness level of the sensor is less than an operational cleanliness threshold, wherein sensor cleaning operation cleans the sensor to the target cleanliness level. In some examples, the method determines the target cleanliness level on a per route basis, a per weather condition basis, and/or a per contaminate type basis.

In some examples, the method further includes analyzing sensor cleaning data associated with the sensor to identify a sensor cleaning trend associated with the sensor, determining a vehicle operation parameter that optimizes sensor cleaning fluid usage based on the sensor cleaning trend, and initiating a vehicle operation action based on the vehicle operation parameter. In some examples, analyzing the sensor cleaning data associated with the sensor to identify the sensor cleaning trend associated with the sensor can include correlating sensor cleaning cycle frequency with a trailing distance of the vehicle. In such examples, determining the vehicle operation parameter that optimizes sensor cleaning fluid usage based on the sensor cleaning trend can include determining an optimal trailing distance for reducing sensor cleaning cycle frequency. In such examples, initiating the vehicle operation action based on the vehicle operation parameter can include communicating the optimal trailing distance to an adaptive cruise control system of the vehicle, such that the adaptive cruise control system can adjust a current trailing distance of the vehicle to the optimal trailing distance. In such examples, the initiating the vehicle operation action based on the vehicle operation parameter can include causing generation of a driver notification including the optimal trailing distance.

In some examples, the analyzing the sensor cleaning data associated with the sensor to identify the sensor cleaning trend associated with the sensor can include determining a first amount of sensor cleaning fluid used to clean the sensor along a predetermined travel route when the vehicle operates in manual mode and a second amount of sensor cleaning fluid used to clean the sensor along the predetermined travel route when the vehicle operates in an autonomous mode. In such examples, the determining the vehicle operation parameter that optimizes sensor cleaning fluid usage based on the sensor cleaning trend can include determining the first amount of sensor cleaning fluid used to clean the sensor along the predetermined travel route when the vehicle operates in the manual mode is less than the second amount of sensor cleaning fluid used to clean the sensor along the predetermined travel route when the vehicle operates in the autonomous mode. In such examples, the initiating the vehicle operation action based on the vehicle operation parameter can include generating a driver notification that recommends operating the vehicle in manual mode along the predetermined travel route.

An exemplary vehicle includes a sensor system configured to generate sensor data associated with an external environment of the vehicle, an advanced driver assistant system configured to use the sensor data to at least partially assist in navigating the vehicle, and a sensor cleaning system commutatively coupled to the sensor system and the advanced driver assistant system. The sensor cleaning system includes a sensor cleaning fluid source, a sensor cleaning fluid delivery system configured to deliver sensor cleaning fluid to sensors of the sensor system, and a sensor cleaning control system. In some examples, the sensor cleaning control system is configured to collect sensor cleaning data associated the sensors and determine target cleanliness levels for the sensors based on the sensor cleaning data. The target cleanliness levels are less than a maximum cleanliness level that indicates that the sensors are free of contaminate. At least two sensors have different target cleanliness levels. In some examples, the sensor cleaning control system is configured to monitor cleanliness levels of the sensors and initiate a sensor cleaning operation when a cleanliness level of one of the sensors is less than an operational cleanliness threshold, wherein the sensor cleaning fluid delivery system delivers sensor cleaning fluid to the one of the sensors during the sensor cleaning operation to clean the one of the sensors to a respective target cleanliness level of the target cleanliness levels.

In some examples, the sensor cleaning control system is configured to correlate sensor cleaning cycle frequency with a trailing distance of the vehicle, determine an optimal trailing distance for reducing sensor cleaning cycle frequency, and communicate the optimal trailing distance to the advanced driver assistant system. In such examples, the advanced driver assistant system is configured to adjust the navigating of the vehicle in response to learning the optimal trailing distance. In some examples, the advanced driver assistant system includes an adaptive cruise control system configured to adjust a current trailing distance of the vehicle in response to learning the optimal trailing distance.

BRIEF DESCRIPTION OF THE DRAWINGS

FIG. 3 is a flow diagram of a method for cleaning vehicles sensors that optimizes sensor cleaning fluid usage, which can be implemented by the vehicle sensor cleaning system of FIG. 1 and FIG. 2, according to one or more implementations of the present disclosure.

FIG. 4 is a flow chart of a method for cleaning vehicles sensors that optimizes sensor cleaning fluid usage, which can be implemented by the vehicle sensor cleaning system of FIG. 1 and FIG. 2, according to one or more implementations of the present disclosure.

DETAILED DESCRIPTION

The illustrative implementations and related methods of the present disclosure are described below as they might be employed in a system and method for cleaning vehicle sensors. In the interest of clarity, not all features of an actual implementation or method are described in this specification. It will of course be appreciated that in the development of any such actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various implementations and related systems and methods for cleaning vehicle sensors of the disclosure will become apparent from consideration of the following description and drawings.

Systems and methods for cleaning vehicle sensors are disclosed that optimize sensor cleaning fluid usage. An exemplary vehicle sensor cleaning system includes a sensor cleaning fluid delivery system that delivers sensor cleaning fluid to a sensor of a vehicle and a sensor cleaning control system in communication with the sensor cleaning fluid delivery system. The sensor cleaning control system determines a target cleanliness level for the sensor based on sensor cleaning data associated with the sensor. The target cleanliness level is less than a maximum cleanliness level indicating indicates a contaminate-free sensor. The sensor cleaning control system further monitors a cleanliness level of the sensor and initiates a sensor cleaning operation when the cleanliness level of the sensor is less than an operational cleanliness threshold, such that the sensor cleaning fluid delivery system delivers sensor cleaning fluid to the sensor to clean the sensor to the target cleanliness level.

Figure 1:
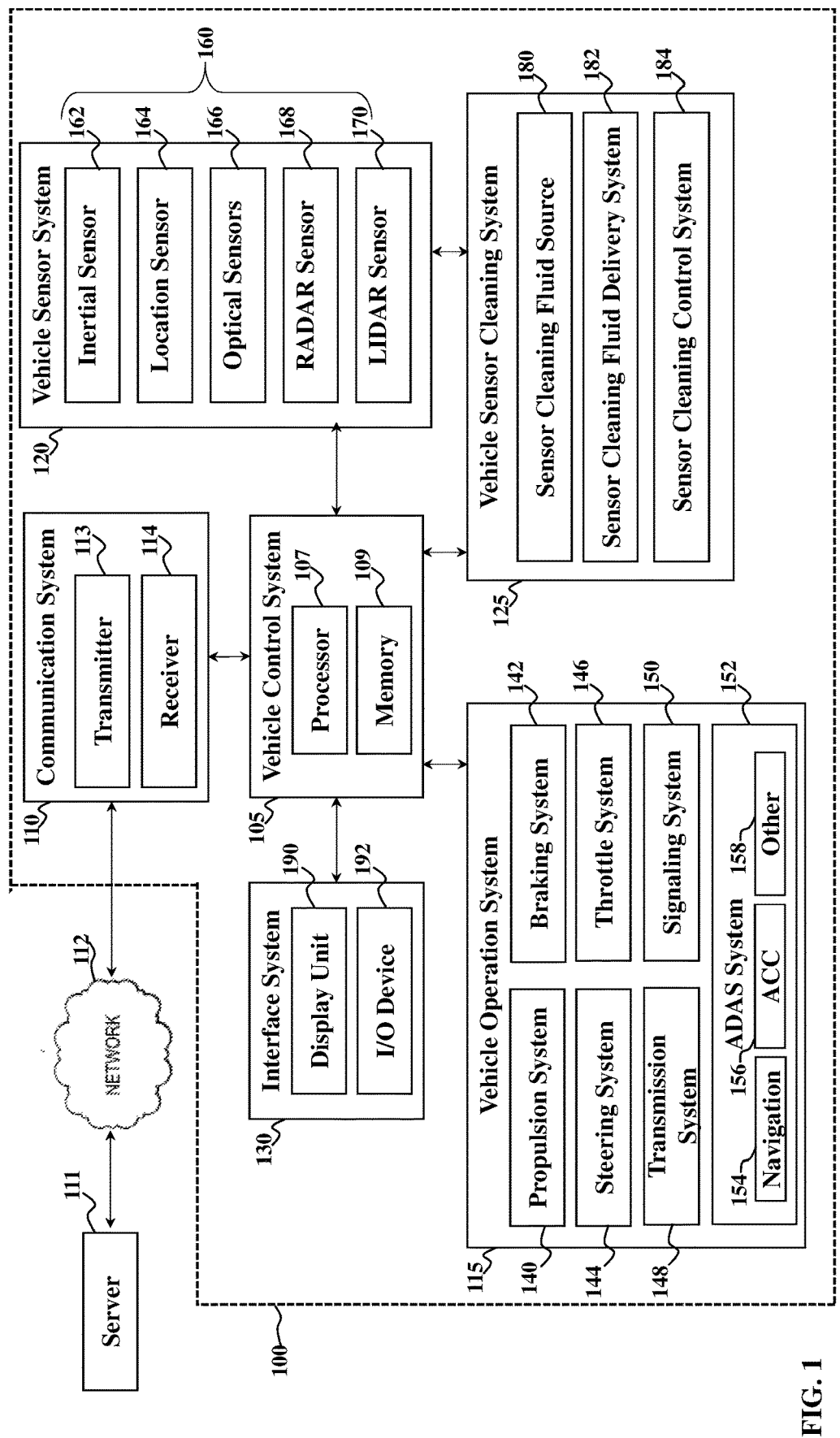
FIG. 1 is a block diagram of a vehicle that includes a vehicle sensor cleaning system according to one or more implementations of the present disclosure.
Figure 2:
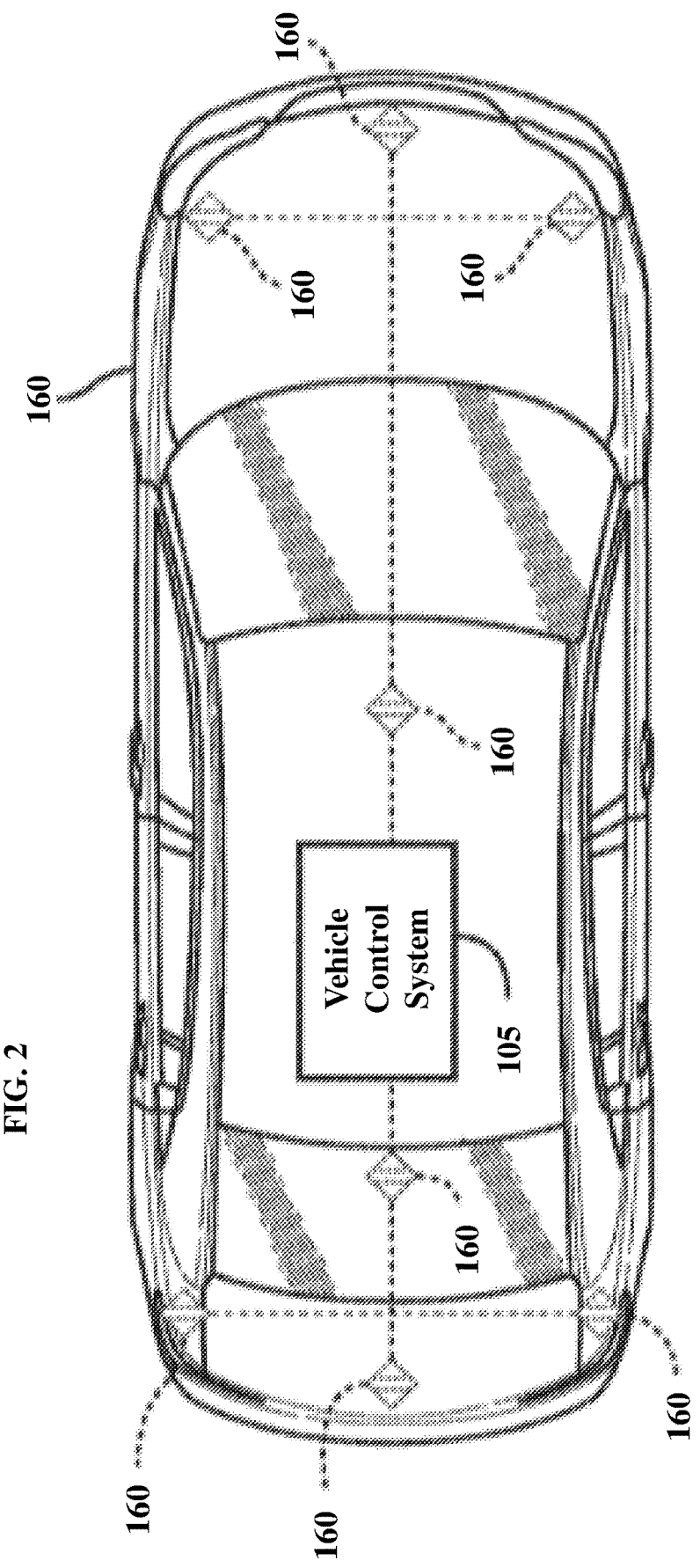
FIG. 2 is a pictorial representation of the vehicle that includes the vehicle sensor cleaning system according to one or more implementations of the present disclosure.

FIG. 1 is a block diagram of a vehicle 100 according to various aspects of the present disclosure, and FIG. 2 is a pictorial representation of vehicle 100 according to various aspects of the present disclosure. FIG. 1 and FIG. 2 have been simplified for the sake of clarity to better understand the inventive concepts of the present disclosure. Additional features can be added in vehicle 100, and some of the features described below can be replaced, modified, or eliminated for additional embodiments of vehicle 100. Further, while the various features are depicted as located within vehicle 100, the present disclosure contemplates implementations, where one or more of the features are located external to vehicle 100.

Vehicle 100 is any means of motorized transport, such as a ground-based vehicle (e.g., car, truck, bus, etc.), an air-based vehicle (e.g., airplane, drone, helicopter, or other aircraft), or other type of vehicle (e.g., watercraft). Vehicle 100 includes a vehicle control system 105 operably coupled to, and adapted to be in communication with, a communication system 110, a vehicle operation system 115, a vehicle sensor system 120, a vehicle sensor cleaning system 125, and an interface system 130 (collectively referred to hereinafter as vehicle systems) via wired or wireless communication (e.g., via an in-vehicle network), such that vehicle control system 105 can at least partially control operation of vehicle 100 and/or the various vehicle systems of vehicle 100, including interaction of data with and between the various vehicle systems of vehicle 100. In some examples, vehicle control system 105, communication system 110, vehicle operation system 115, vehicle sensor system 120, vehicle sensor cleaning system 125, and/or interface system 130 communicate (e.g., transmit and receive messages and/or data) using a controller area network (CAN) bus. In addition to, or instead of, being operably coupled to, and configured to be in communication with, vehicle control system 105, communication system 110, vehicle operation system 115, vehicle sensor system 120, vehicle sensor cleaning system 125, and/or interface system 130 may be operably coupled to, and configured to be in communication with, another of the systems and/or components via wired or wireless communication (e.g., via an in-vehicle network). For example, as described further below, vehicle sensor cleaning system 130 may be operably coupled to, and configured to be in communication with, vehicle sensor system 125 to facilitate sensor cleaning operations.

Vehicle control system 105 can control and/or coordinate operations of the vehicle systems to facilitate various operational modes of vehicle 100, such as a manual mode, an autonomous mode, a semi-autonomous mode, and/or other operational mode. In manual mode, a human driver (or operator) monitors a driving environment of vehicle 100, navigating and maneuvering vehicle 100 along a travel route with minimal to no input from vehicle control system 105. For example, the human driver manually controls everything independently, including steering, throttling, braking, etc. In semi-autonomous mode (also referred to as assisted driving mode), a human driver and vehicle control system 105 both monitor the driving environment of vehicle 100, each performing tasks to navigate and maneuver vehicle 100 along a travel route. For example, vehicle control system 105 can control and/or coordinate operations of the vehicle systems to implement safety and/or driver-assist tasks, such as blind-spot assistance, crash avoidance, emergency braking, parking assistance, cruise control, adaptive cruise control (ACC), lane-keep assistance, lane-departure warning, traffic jam assistance, queuing assistance, other type of safety and/or driver-assist task, or combinations thereof. As merely one example, the human driver can activate an ACC system, controlled by vehicle control system 105, that is configured to accelerate and decelerate vehicle 100 to maintain a safe distance between vehicle 100 and vehicles ahead. In such example, the human driver sets a maximum speed and vehicle control system 105 instructs the ACC system whether to adjust a speed of vehicle 100 based on data received from vehicle sensor system 120, but vehicle 100 is otherwise operated manually by the human driver. For example, the human driver manually controls steering, and the human driver can deactivate the ACC system by depressing a brake pedal of vehicle 100. In autonomous mode, vehicle control system 105 monitors the driving environment of vehicle 100, navigating and maneuvering vehicle 100 along a travel route with minimal to no input and/or supervision from a human driver. In some examples, vehicle 100 operates in a monitored autonomous mode, where vehicle control system 105 generates a signal (e.g., an audial signal, a visual signal, a haptic signal, etc.) to the human driver in response to a triggering event, where vehicle control system 105 awaits an action from the human driver within a predetermined amount of time. If such action is not taken within the predetermined amount of time, vehicle control system 105 can implement one or more safety maneuvers, such as navigating and/or maneuvering vehicle 100 to a side or shoulder of a road, navigating and/or maneuvering vehicle 100 into a nearest parking lot, reducing a speed of vehicle 100, bringing and/or keeping vehicle 100 to/at a stop, navigating and/or maneuvering vehicle 100 to a next exit on a road, navigating and/or maneuvering vehicle 100 to an emergency center (e.g., a hospital), and/or other safety maneuver. The present disclosure contemplates that vehicle 100 can switch between the various operational modes automatically or manually to optimize vehicle operation and/or driving experience. In some examples, as described herein, vehicle 100 is configured to switch from autonomous mode and/or semi-autonomous mode to manual mode in a manner that optimizes sensor cleaning fluid usage of vehicle sensor cleaning system 125, in some implementations, to extend a travel distance of vehicle 100. Such switching can be initiated and/or caused by vehicle control system 105, vehicle operation system 115, and/or vehicle sensor cleaning system 125 according to various aspects of the present disclosure.

Vehicle control system 105 receives, stores, and/or processes information and/or data from the vehicle systems. For example, vehicle control system 105 receives and processes sensor data from vehicle sensor system 120 to analyze an external environment of vehicle 100 and generate instructions to vehicle operating system 115 to navigate and/or maneuver vehicle 100 along a travel route in the external environment, thereby facilitating semi-autonomous mode and/or autonomous mode of vehicle 100. Vehicle control system 105 includes a processor 107 operatively and communicatively coupled to a memory 109, for example, by a bus. In some examples, processor 107 includes a microprocessor, a microcontroller, a digital signal processor (DSP), a field-programmable gate array (FPGA), a programmable logic array (PLA), an application specific integrated circuit (ASIC), a central processing unit (CPU), a controller, an array processor, a vector processor, programmable logic circuitry, and/or other circuitry that can execute instructions and/or software. In some examples, processor 107 includes at least one hardware circuit (e.g., an integrated circuit) configured to carry out instructions contained in program code stored by memory 109. In some examples, processor 107 represents multiple processors operatively and communicatively coupled, which can be disbursed throughout vehicle 100, where the multiple processors can work independently from one another or work collaboratively to facilitate operation of vehicle 100. In some examples, processor 107 is a main processor of vehicle 100, such as an engine control unit (ECU). Memory 109 stores data and instructions that can be executed by processor 107 to cause vehicle control system 105 to perform operations and/or allow vehicle control system 105 to cause the vehicle systems to perform operations as described herein. In some examples, memory 109 includes a non-transitory computer-readable storage medium, such as random access memory (RAM), read only memory (ROM), flash memory, programmable ROM (PROM), erasable programmable ROM (EPROM), electrically erasable ROM (EEPROM), registers, magnetic disks, optical disks, hard drives, and/or any other suitable storage medium. In some examples, each of the vehicle systems includes their own dedicated processor and dedicated memory that cooperate with the processors and memories of vehicle control system 105 and/or each of the other vehicle systems of vehicle 100. Accordingly, in some examples, vehicle control system 105 forms a part of any one or more of the described vehicle systems, such as communication system 110, vehicle operation system 115, vehicle sensor system 120, vehicle sensor cleaning system 125, interface system 130, and/or other vehicle system of and/or associated with vehicle 100.

Communication system 110 is configured to facilitate wired and/or wireless communication of vehicle 100 with external sources, such as with a server 111 via a network 112 (e.g., a 3G network, a 4G network, a 5G network, a Wi-Fi network, Internet, intranet, or the like). Server 111 may provide information and services including but not limited to location, mapping, scheduling, SMS, and email. In some examples, communication system 110, which is operably coupled to, and adapted to be in communication with, vehicle control system 105, includes a transmitter 113 and a receiver 114. In some examples, one or the other of transmitter 113 and receiver 114 may be omitted according to the particular use application for communication system 110. In other examples, transmitter 113 and receiver 114 are combined into a single transceiver that performs both transmitting and receiving functions.

Vehicle operation system 115 is configured to perform and/or control vehicle operation functions, thereby facilitating driving of vehicle 100. In this regard, vehicle operation system 115 may communicate with vehicle control system 105, to not only receive instructions from vehicle control system 105, but to provide information about operation of vehicle 100 to vehicle control system 105. Vehicle operation system 115 includes various vehicle components, such as an engine (or motor), a battery, a radiator, an alternator, a front axle, front steering and suspension components, a rear axle, rear suspension components, wheels, brakes, a transmission, a catalytic converter, a muffler, a tailpipe, a fuel tank, electronic and/or processing components, and/or other vehicle components. Vehicle operation system 115 further includes various vehicle systems that can perform vehicle operation functions and/or cause vehicle 100 and/or the various vehicle components to perform the various vehicle operation functions. For example, vehicle operation system 115 includes a propulsion system 140, a braking system 142, a steering system 144, a throttle system 146, a transmission system 148, a signaling system 150, an advanced driver assistance system (ADAS) 152 (including, for example, a navigation system 154, an ACC system 156, and/or other type of ADAS system 158), and/or other vehicle system that can perform and/or control vehicle operation functions. The various vehicle components may be a portion of one or more of the vehicles systems of vehicle operation system 115.

Propulsion system 140 includes any arrangement of various linkages and/or components configured to generate force to cause motion of vehicle 100, such as forward motion. The various linkages and/or components can include one or more engine (e.g., an internal combustion engine and/or electric motor), energy source, control unit (which may be a portion of or separate from vehicle control system 105), rod, fulcrum, spring, pin, bracket, axle, seal, gasket, other linkages and/or components, or combinations thereof.

Braking system 142 includes any arrangement of various linkages and/or components configured to stop and/or decelerate vehicle 100. In some examples, braking system 142 can convert kinetic energy of vehicle 100 into heat energy that can stop and/or decelerate vehicle 100. The various linkages and/or components can include one or more brake line, brake drum, brake disc, brake shoe, brake rotor, brake caliper, brake pad, master cylinder, brake fluid, control unit (for example, a brake ECU, which may be a portion of or separate from vehicle control system 105), rod, fulcrum, spring, pin, bracket, axle, seal, gasket, other linkages and/or components, or combinations thereof. In some examples, braking system 142 is configured to provide vehicle 100 with an anti-lock braking system.

Steering system 144 includes any arrangement of various linkages and/or components configured to control a direction or a heading of vehicle 100. The various linkages and/or components can include one or more steering wheel, steering column, steering shaft, steering arm, tie rod, track rod, Pitman arm, Idler arm, control unit (which may be a portion of or separate from vehicle control system 105), rod, fulcrum, spring, pin, bracket, axle, seal, gasket, other linkages and/or components, or combinations thereof. In some examples, steering system 144 is a rack-and-pinion steering system, a steering-box steering system, a power-assist steering system, other type of steering system, or combinations thereof.

Throttle system 146 includes any arrangement of various linkages and/or components configured to control a power of the engine and/or the motor of vehicle 100 and/or a speed of vehicle 100. In some examples, throttle system 145 is configured to regulate an amount of fuel and/or air entering the engine and/or the motor of vehicle 100. The various linkages and/or components can include one or more engine, motor, throttle body, accelerator (and/or gas) pedal, throttle valve, control unit (which may be a portion of or separate from vehicle control system 105), rod, fulcrum, spring, pin, bracket, axle, seal, gasket, other linkages and/or components, or combinations thereof.

Transmission system 148 includes any arrangement of various linkages and/or components configured to transmit power from the system (or motor), such as rotational and/or mechanical power, to the wheels of vehicle 100. The various linkages and/or components can include one or more shaft (for example, input shaft(s), output shaft(s), and/or counter shaft(s)), drive gear, idle gear, planetary gear, synchronizer sleeve (or collar), gear shifter, shift rod, shift fork, clutch, torque converter, oil pump, hydraulic system, valve body, control unit (which may be a portion of or separate from vehicle control system 105), governor, throttle cable, vacuum modulator, rod, fulcrum, spring, pin, bracket, axle, seal, gasket, other linkages and/or components, or combinations thereof. In some examples, transmission system 168 is configured to provide vehicle 100 with a manual transmission, an automatic transmission, a continuously variable transmission, other type of transmission, or combinations thereof.

Signaling system 150 includes any arrangement of various linkages and/or components configured to provide information about vehicle 100 to drivers and/or pedestrians in a vicinity of vehicle 100 using, for example, lighting. The various linkages and/or components can include one or more headlight, taillight, brake light, hazard light, turn signal light, control unit (which may be a portion of or separate from vehicle control system 105), rod, fulcrum, spring, pin, bracket, axle, seal, gasket, other linkages and/or components, or combinations thereof. In some examples, signaling system 150 indicates a presence of vehicle 100, a direction and/or a speed of travel of vehicle 100, a driver's intensions regarding a direction and/or speed of travel (e.g., left/right turn signal lights indicate impending left/right turn of vehicle 100, brake lights indicate impending deceleration and/or stopping of vehicle 100, etc.)

ADAS 152 includes any arrangement of various linkages and/or components configured to execute safety tasks and/or driver assistance tasks, which allow vehicle 100 to operate in different modes, such as manual mode, semi-autonomous mode, and/or autonomous mode, and/or enhance safety of vehicle 100. In some examples, ADAS 152 is configured to determine a travel route and navigate and/or maneuver and/or cause the various systems of vehicle operation system 110 to navigate and/or maneuver vehicle 100 along the determined travel route. In some examples, ADAS 152 is further configured to modify and/or cause modification of a driving maneuver of vehicle 100 and/or a travel route of vehicle 100. In some examples, ADAS 152 can include navigation system 154, ACC system 156, and/or other type of ADAS system, such as an adaptive light control system, an automatic braking system, an automatic parking system, a blind spot detection system, a collision avoidance system, a driver drowsiness detection system, a hill descent control system, an intelligent speed adaptation system, a lane departure warning system, a night vision system, a tire pressure monitoring system, and/or other type of ADAS system that can perform desired safety tasks and/or driver assistance task for vehicle 100. In some examples, ADAS 152, navigation system 154, ACC 156, and/or other type of ADAS system is a portion of vehicle control unit 105 and utilizes processor 107 and/or memory 109 to execute instructions (e.g., software, firmware, and/or the like) to carry out desired safety tasks and/or driver assistance tasks. In some examples, ADAS 152, navigation system 154, ACC 156, and/or other type of ADAS system has a dedicated processor and/or a dedicated memory utilized to execute instructions (e.g., software, firmware, and/or the like) to carry out desired safety tasks and/or driver assistance tasks. In some examples, ADAS 152 receives and analyzes sensor data from vehicle sensor system 120, which can be stored in memory 109 of vehicle control unit 105, to assist in carrying out desired safety tasks and/or driver assistance tasks.

Navigation system 154 includes any arrangement of various linkages and/or components configured to determine a geographic location of vehicle 100 and/or a travel route for vehicle 100 to arrive at a particular geographic location. In some examples, navigation system 154 includes one or more mapping applications to determine the travel route. For example, a vehicle occupant may input a particular geographic location via interface system 130. The mapping application can determine one or more travel routes between a starting geographic location (e.g., a vehicle occupant specified origin location and/or a current geographic location of vehicle 100 as determined by navigation system 154) and the particular geographic location, along with various travel parameters (e.g. shortest travel distance, shortest amount of travel time, etc.). The vehicle occupant can then select one of the travel routes via interface system 130. In some examples, navigation system 154 can update the travel route dynamically while the vehicle 100 is navigating and/or maneuvering along the travel route to the particular location. In some examples, navigation system 154 includes a global positioning system, a local positioning system, a geolocation system, and/or other positioning system. In some examples, navigation system 154 receives and analyzes sensor data from vehicle sensor system 120 to assist in the navigation services. In some examples, navigation system 154 receives and/or transmits location information from server 111 via network 112 and/or communication system 110.

ACC system 156 includes any arrangement of various linkages and/or components configured to adjust a vehicle speed to maintain a safe distance between vehicle 100 and a preceding vehicle. In some examples, ACC system 156 is configured to adjust a trailing distance between vehicle 100 and the preceding vehicle based on sensor cleaning needs, as described herein. In some examples, ACC system 156 accelerates and/or decelerates vehicle 100 to maintain the safe distance. In some examples, ACC system 156 receives and analyzes sensor data from vehicle sensor system 120 to assist in ACC tasks.

Vehicle sensor system 120 includes vehicle sensors 160 disposed on and/or affixed to various locations on and/or within vehicle 100. In some examples, vehicle sensors 160 are located on a roof of vehicle 100 (for example, in a housing mounted on the roof of vehicle 100), a rear bumper of vehicle 100, a front bumper of vehicle 100, a body panel of vehicle 100, proximate a front windshield and/or a rear windshield of vehicle 100, and/or other position on, in, and/or within vehicle 100. Vehicle sensors 160 are configured to monitor vehicle 100 (for example, vehicle operational parameters of vehicle 100 and/or components of vehicle 100), driving behavior, environmental conditions (for example, an internal environment and/or an external environment of vehicle 100), and/or other conditions associated with vehicle 100 and/or with operation of vehicle 100. Some vehicle sensors 160 can detect various vehicle operation parameters, such as vehicle speed, vehicle direction, vehicle acceleration, vehicle rotation, vehicle location. Some vehicle sensors 160 can detect environmental weather conditions, traffic conditions, and/or road conditions. Some vehicle sensors 160 can detect information about objects, including stationary objects and/or moving objects, within the external environment of vehicle 100. Some vehicle sensors 160 can monitor one or more vehicle components of vehicle 100 (e.g., one or more humidity sensor, temperature sensor, barometric pressure sensor, shock/vibration sensor, vehicle impact sensor, airbag sensor, braking sensor, battery load sensor, fuel sensor, and/or other type of sensor). As used herein, sensors 160 refer to any device, component, and/or system that can detect, determine, assess, monitor, measure, quantify and/or sense information relevant to operating vehicle 100, and in particular, information relevant to executing ADAS applications and/or vehicle sensor cleaning operations, such as those carried out by vehicle sensor cleaning system 125. Sensors 160 can work collaboratively and/or independently of one another to accomplish various functions described herein, and in some examples, combine to form a sensor network.

In FIG. 1, vehicle sensors 160 include inertial sensors 162, location sensors 164, optical sensors 166, RADAR (radio detection and ranging) sensors 168, LIDAR (light imaging, detection, and ranging) sensors 170, and/or other types of sensors, each of which can be operatively coupled to, and adapted to be in communication with, vehicle control system 105, communication system 110, vehicle operation system 115, vehicle sensor cleaning system 125, and/or interface system 130. Inertial sensors 162, location sensors 164, optical sensors 166, RADAR sensors 168, and/or LIDAR sensors 170 can be utilized for blind spot detection, lane-change assistance, collision warning/avoidance assistance (using, for example, rear end radar sensors), park assistance, cross-traffic monitoring, brake assistance, electronic stability control, air bag control, emergency braking assistance, automatic distance control, navigation applications, ACC applications, and/or other safety and/or ADAS applications.

Inertial sensors 162 can measure and/or detect translational acceleration and/or rotational acceleration associated with vehicle 100 and/or components of vehicle 100. In some examples, inertial sensors 162 include accelerometers, gyroscopes, and/or magnetometers. In some examples, one or more accelerometers, gyroscopes, and/or magnetometers can be combined to form an inertial measurement unit (IMU) for measuring yaw, roll rate, pitch rate, lateral acceleration, longitudinal acceleration, and/or vertical acceleration associated with vehicle 100. Location (or position) sensors 164 can measure and/or detect a location and/or a position of vehicle 100 and/or objects in the external environment of vehicle 100. In some examples, location sensors 164 utilize a global positioning system to determine a location of vehicle 100. Optical sensors 166 can measure and/or detect light and convert the light into an electrical signal that provides information about vehicle 100 and/or the external environment of vehicle 100. In some example, cameras can capture image data using optical sensors 166 (which can be configured as charge coupled devices (CCD), complementary metal oxide semiconductors (CMOS), and/or other type of image-capturing elements). In some examples, optical sensors 166 can be arranged and configured to capture a 360-degree view of the external environment of vehicle 100. RADAR sensors 168 use radio waves (signals) for detecting and locating objects in the external environment of vehicle 100. In some examples, RADAR sensors 168 assist in differentiating between vehicles, pedestrians, trees, traffic markers (e.g., signs, lane markings, etc.), and/or other objects in the external environment of vehicle 100. In some examples, RADAR sensors 168 can detect a presence of the objects, a position of the objects, a speed of the objects, a movement of the objects, and/or a distance between vehicle 100 and the objects in the external environment. LIDAR sensors 170 use light waves (signals) emitted from a laser for detecting and locating objects in the external environment of vehicle 100. In some examples, LIDAR sensors 170 can be used to generate a three-dimensional map of objects and surroundings in an external environment of vehicle 100. In some examples, the three-dimensional map can be output on a display unit via interface system 130. In some examples, LIDAR sensors 170 assist in differentiating between vehicles, pedestrians, trees, traffic markers (e.g., signs, lane markings, etc.), and/or other objects in the external environment of vehicle 100. In some examples, LIDAR sensors 170 can detect a presence of the objects, a position of the objects, a speed of the objects, a movement of the objects, and/or a distance between vehicle 100 and the objects in the external environment.

Over time, sensors 160 accumulate contaminate thereon that degrades an ability of sensors 160 to collect data used by vehicle control system 105 to carry out various vehicle operation functions of vehicle 100, particularly when in autonomous mode and/or semi-autonomous mode. Contaminate can include dust, debris, dirt, rain, ice, snow, insect and/or animal splatter and/or feces, pollen, salt, and/or other type of contaminate that degrades operation of sensors 160. Vehicle 100 is thus provided with vehicle sensor cleaning system 125 for automatically and/or manually cleaning sensors 160, as needed, to ensure optimal operation of sensors 160. During sensor cleaning, vehicle 100 may either be stopped (in other words, not driven) or operate in manual mode (in other words, requiring the human driver to completely control navigating and/or maneuvering of vehicle 100) for an amount of time until sensors 160 are ready to resume operation. An amount of remaining sensor cleaning fluid can limit how far (for example, a distance) vehicle 100 can safely travel. For example, when contaminate builds up on sensors 160 to a degree requiring cleaning but vehicle sensor cleaning system 125 runs out of sensor cleaning fluid or does not have enough sensor cleaning fluid to clean sensors 160 sufficiently, vehicle 100 may not be safely operated in semi-autonomous mode and/or autonomous mode. Optimizing use of sensor cleaning fluid can thus improve functioning of vehicle 100 and extend how far vehicle 100 can safely travel.

As described herein, vehicle sensor cleaning system 125 cleans sensors 160 in a manner that efficiently uses and/or preserves sensor cleaning fluid to maximize a distance vehicle 100 can safely travel without running out of sensor cleaning fluid. In some examples, vehicle sensor cleaning system 125 is configured to clean sensors 160 based on learned and/or assigned target cleanliness levels for sensors 160 (for example, a target cleanliness level that is less than completely clean and free of obstruction), which levels can be adjusted based on operating/environment conditions (for example, route, weather, etc.). In some examples, vehicle sensor cleaning system 125 is configured to recommend trailing distances based on how such trailing distance affects sensor cleaning fluid usage. In some examples, vehicle sensor cleaning system 125 is configured to recommend/initiate manual mode of vehicle 100 based on sensor cleaning fluid usage. The present disclosure contemplates any configuration of vehicle sensor cleaning system 125 that optimizes sensor cleaning fluid usage as described herein.

In FIG. 1, vehicle sensor cleaning system 125 includes a sensor cleaning fluid source 180, a sensor cleaning fluid delivery system 182, and a sensor cleaning control system 184. Sensor cleaning fluid source 180 includes any suitable sensor cleaning fluid, such as a cleaning gas (e.g., air) and/or a cleaning liquid (e.g., water and/or a detergent-based liquid). Sensor cleaning fluid source 180 can include a reservoir, a tank, and/or any other suitable means for storing the sensor cleaning fluid. Sensor cleaning fluid delivery system 182 includes any arrangement of various linkages and/or components configured to deliver sensor cleaning fluid from sensor cleaning fluid source 180 to sensors 160. The various linkages and/or components can include one or more nozzle, blower, wiper blade, actuator, liquid pump, gas pump (in some examples, configured to provide compressed gas), fluid delivery lines and/or pipes, control unit (which may be a portion of or separate from vehicle control system 105), heater, agitator (for example, to vibrate the sensor), rod, fulcrum, spring, pin, bracket, axle, seal, gasket, other linkages and/or components, or combinations thereof. In some examples, sensor cleaning fluid delivery system 182 is configured to deliver a "knife" of air to sensors 160 for cleaning. In some examples, sensor cleaning fluid delivery system 182 is configured to spray detergent-based liquid across sensors 160 using one or more nozzle. In some examples, sensor cleaning fluid delivery system 182 is configured to wipe detergent-based liquid across sensors 160 using one or more wiper blade.

Sensor cleaning control system 184 includes any arrangement of various linkages and/or components configured to carry out sensor cleaning operations in a manner that efficiently uses and/or preserves sensor cleaning fluid, where sensor cleaning fluid delivery system 182 delivers sensor cleaning fluid to sensors 160 during the sensor cleaning operations. In some examples, sensor cleaning control system 184 is a portion of vehicle control unit 105 and utilizes processor 107 and/or memory 109 to execute instructions (e.g., software, firmware, and/or the like) to carry out the sensor cleaning operations as described herein. In some examples, sensor cleaning control system 184 has a dedicated processor and/or a dedicated memory utilized to execute instructions (e.g., software, firmware, and/or the like) to carry out the sensor cleaning operations as described herein. In some examples, sensor cleaning control system 184 utilizes processor 107, memory 109, a dedicated processor, and/or a dedicated memory to execute instructions (e.g., software, firmware, and/or the like) to carry out the sensor cleaning operations as described herein.

FIG. 3 is a flow chart of a method 300 for cleaning a sensor of a vehicle in a manner that optimizes sensor cleaning fluid usage, which can be implemented by sensor cleaning control system 184 to clean sensors 160, according to various aspects of the present disclosure. At block 310, method 300 includes collecting sensor cleaning data associated with the sensor. The sensor cleaning data can include a type of the sensor, a location (or position) of the sensor relative to the vehicle and/or external environment of the vehicle, a cleaning frequency (e.g., how often the sensor is cleaned), a location and/or travel route of the vehicle when a sensor cleaning operation is initiated for cleaning the sensor, a location and/or travel route of the vehicle when a sensor cleaning operation is initiated for cleaning the sensor, an amount of sensor cleaning fluid used to clean the sensor for various defined sensor cleanliness levels, an amount of sensor cleaning fluid used to clean each type of contaminate from the sensor, and/or any other information associated with cleaning the sensor and/or maintaining desired performance of the sensor. In some examples, sensor cleaning control system 184 of vehicle sensor cleaning system 125 stores the sensor cleaning data in a memory, such as memory 109 of vehicle control system 105 and/or a dedicated memory for sensor cleaning control system 184.

At block 320, method 300 includes determining a target cleanliness level for the sensor based on the sensor cleaning data. The target cleanliness level is less than a maximum cleanliness level but greater than or equal to an operational cleanliness threshold. The maximum cleanliness level indicates that the sensor is completely free of contaminate. The operational cleanliness threshold indicates that the sensor can function properly, allowing safe and/or desirable operation of vehicle 100, though such functioning may be partially degraded or less than optimal because of contaminate on the sensor. The sensor may thus have contaminate thereon when at the target cleanliness level.

In some examples, a sensor cleanliness level can be rated from 1 to 10, with 10-cleanliness level being the maximum cleanliness level. The operational cleanliness threshold can be set at 5-cleanliness level, where if the sensor's cleanliness level falls below 5-cleanliness level, the sensor cannot function properly and thus degrade operation of vehicle 100. An amount of sensor fluid usage is then considered for each potential target cleanliness level based on the sensor cleaning data associated with the sensor. In some examples, sensor cleaning control system 184 analyzes the sensor cleaning data to determine how much sensor cleaning fluid is required to clean the sensor to each potential target cleanliness level, along with how long a cleanliness level of the sensor is greater than the operational cleanliness threshold following cleaning of the sensor to each potential target cleanliness level. For example, sensor cleaning control system 184 can analyze the sensor cleaning data to determine an amount of sensor cleaning fluid used for cleaning the sensor over a 100-mile drive when the sensor is cleaned to a 10-cleanliness level (the maximum cleanliness level), a 9-cleanliness level, an 8-cleanliness level, a 7-cleanliness level, and a 6-cleanliness level. Sensor cleaning control system 184 can further analyze the sensor cleaning data to determine how long a cleanliness level of the sensor is greater than the operational cleanliness threshold following cleaning of the sensor to each of the 10-cleanliness level through the 6-cleanliness level and an operation quality of the sensor at each of the 10-cleanliness level through the 6-cleanliness level. In such example, sensor cleaning control system 184 may determine that the sensor was cleaned more frequently along the 100-mile drive when cleaned to the 7-cleanliness level versus the 10-cleanliness level, but less sensor cleaning fluid was used to clean the sensor to the 7-cleanliness level versus the 10-cleanliness level. Sensor cleaning control system 184 may further determine that the operation quality of the sensor at the 7-cleanliness level is sufficient for safe and/or desired operation of vehicle 100. Accordingly, based on such determinations, sensor cleaning control system 184 recognizes that expending sensor cleaning fluid to clean the sensor to the 10-cleanliness level is not the most efficient use of sensor cleaning fluid, and thus sets the target cleanliness level for the sensor to the 7-cleanliness level. In some examples, method 300 determines the target cleanliness level on a per route basis (e.g., on this road the target cleanliness level is set to the 8-cleanliness level instead of the 7-cleanliness level due to a condition of the road), a per weather condition basis (e.g., in rain, the target cleanliness level is set to the 6-cleanliness level instead of the 7-cleanliness level because the rain aids in cleaning the sensor due to its position), and/or a per contaminate basis (e.g., the target cleanliness level is set to 9-cleanliness level for insect splatter instead of the 7-cleanliness level for dirt because more sensor fluid is required for sufficiently removing insect splatter). It is noted that while sensor cleaning control system 184 sets the target cleanliness level for the sensor to the 7-cleanliness level, sensor cleaning control system 184 may set target cleanliness levels for other sensors of vehicle sensor system 120 to other cleanliness-levels, such as the 9-cleanliness level, the 8-cleanliness level, and/or the 6-cleanliness level, depending on sensor cleaning date associated with the other sensors of vehicle sensor system 120. In this manner, sensor cleaning control system 184 preserves sensor cleaning fluid of vehicle sensor cleaning system 125 by differentiating cleaning efforts rather than blindly cleaning all sensors of vehicle 100 to a maximum cleanliness level every time.

At block 330, method 300 includes monitoring a cleanliness level of the sensor, for example, while vehicle 100 is navigating and/or maneuvering along a travel route. Sensor cleaning control system 184 monitors the cleanliness level of the sensor by analyzing a quality of sensor data collected by the sensor. In some examples, sensor cleaning control system 184 can monitor an image quality of images collected by a camera to determine a cleanliness level of the camera. In some examples, sensor cleaning control system 184 evaluates an image sharpness, an image brightness, an image pixel characteristic, and/or other image quality characteristic of images collected by the camera to identify image quality degradation. In some examples, sensor cleaning control system 184 can correlate the image quality degradation to how much contaminate has accumulates on a lens of the camera. The present disclosure contemplates any type of monitoring and/or evaluating by sensor cleaning control system 184 that can identify and monitor accumulation of contaminate on the sensor and correlate the accumulation of the contaminate on the sensor to the cleanliness level of the sensor.

At block 340, method 300 includes initiating a sensor cleaning operation when the cleanliness level of the sensor is less than an operational cleanliness threshold. In some examples, sensor cleaning control system 184 initiates a sensor cleaning operation for one of sensors 160 when the cleanliness level falls below the operational cleanliness threshold, such as the 5-cleanliness level. The sensor cleaning operation can include sensor cleaning fluid delivery system 182 delivering sensor cleaning fluid from sensor cleaning fluid source 180 to the one of sensors 160, such that the one of sensors 160 is cleaned to its determined target cleanliness level, such as the 7-cleanliness level. In some examples, sensor cleaning control system 184 determines that a cleanliness level of a camera falls below the operational cleanliness threshold based on identified image quality degradation. In such examples, the sensor cleaning operation can include sensor cleaning fluid delivery system 182 delivering sensor cleaning fluid to a lens of the camera from sensor cleaning fluid source 180 via a nozzle and/or wiping the sensor cleaning fluid across the lens of the camera with a wiper blade until the lens of the camera is partially free of contaminate and the camera is cleaned to the its corresponding target cleanliness level. Method 300 can then return to block 310, where the collected sensor cleaning data is updated with sensor cleaning data associated with the initiated sensor cleaning operation.

FIG. 4 is a flow chart of a method 400 for cleaning a sensor of a vehicle in a manner that further optimizes sensor cleaning fluid usage, which can be implemented by sensor cleaning control system 184 to clean sensors 160, according to various aspects of the present disclosure. At block 410, method 400 includes analyzing sensor cleaning data associated with a sensor to identify a sensor cleaning trend. In some examples, sensor cleaning control system 184 analyzes the sensor cleaning data associated with the sensor that is collected in method 300 at block 310 to identify a sensor cleaning trend. In some examples, sensor cleaning control system 184 recognizes that a trailing distance between vehicle 100 and a preceding (or heading) vehicle impacts sensor cleaning frequency, for example, because an amount of contaminate that accumulates depends on the trailing distance (for example, decreasing the trailing distance (i.e., following another vehicle more closely) may increase an accumulation rate of contaminate, such as debris and/or rain). In such examples, sensor cleaning control system 184 can identify a sensor cleaning trend that correlates sensor cleaning frequency with trailing distance, indicating sensor cleaning frequencies at various trailing distances. Sensor cleaning control system 184 can thus learn how close vehicle 100 should follow a preceding vehicle as it relates to impacting sensor cleaning frequency. In some examples, sensor cleaning control system 184 can identify a sensor cleaning trend that correlates sensor cleaning frequency and/or sensor cleaning fluid usage with travel routes, indicating sensor cleaning frequencies along various travel routes. Sensor cleaning control system 184 can thus learn which travel routes increase and/or decrease sensor cleaning frequency and/or sensor cleaning fluid usage.

At block 420, method 400 includes determining a vehicle operation parameter that optimizes sensor cleaning fluid based on the sensor cleaning trend. In some examples, optimizing sensor cleaning fluid includes minimizing an amount of sensor cleaning fluid used for cleaning the sensor along a predetermined travel route, a predetermined distance, and/or a predetermined time. In some examples, sensor cleaning control system 184 determines an optimal trailing distance for reducing sensor cleaning frequency based on the sensor cleaning trend that correlates sensor cleaning frequency with trailing distance. In some examples, sensor cleaning control system 184 determine how to utilize operation of vehicle 100 in manual mode, based on the sensor cleaning trend that correlates sensor cleaning frequency and/or sensor cleaning fluid usage with travel routes. In such examples, sensor cleaning control system 184 determines a sensor cleaning frequency and/or an amount of sensor cleaning fluid used to clean the sensor on each travel route.

At block 430, method 400 includes initiating a vehicle operation action based on the vehicle operation parameter. Initiating the vehicle operation action can cause a driver of vehicle 100, vehicle operation system 115, propulsion system 140, braking system 142, steering system 144, throttle system 146, transmission system 148, signaling system 150, ADAS system 152 (including navigation system 154, ACC system 156, and/or other ADAS system 158) to adjust operation of vehicle 100 in response to the vehicle operation action. Such adjustment in operation of vehicle 100 can minimize an amount of sensor fluid used while navigating and/or maneuvering vehicle 100 along various travel routes.

In some examples, sensor cleaning control system 184 initiates a vehicle operation action that includes communicating the optimal trailing distance to ADAS system 152, such as to ACC 156. In response, ACC 156 can adjust a current trailing distance of vehicle 100 to the optimal trailing distance. In some examples, sensor cleaning control system 184 initiates a vehicle operation action that includes communicating the optimal trailing distance to a driver of vehicle 100. For example, sensor cleaning control system 184 can generate a driver notification, provided to the driver of vehicle 100 via interface system 130 (including, for example, a human-machine interface (HMI)), that recommends implementing the optimal trailing distance manually or automatically with ACC 156. In some examples, sensor cleaning control system 184 initiates a vehicle operation action that includes communicating when to operate vehicle 100 in a manual mode. For example, when sensor cleaning control system 184 determines that an amount of sensor cleaning fluid used for a predetermined travel route is greater than or equal to a threshold amount of sensor cleaning fluid, sensor cleaning control system 184 can generate a driver notification, provided to the driver of vehicle 100 via interface system 130, that recommends operating vehicle 100 in manual mode while navigating and/or maneuvering through the predetermined travel route. In such example, sensor cleaning control system 184 can determine that over a certain stretch of road, based on sensor cleaning data, there will be a high frequency of sensor cleaning operations that use a high amount of sensor cleaning fluid. Sensor cleaning control system 184 can thus recommend that the driver take control for that stretch of road (e.g., "for next five miles, hands on along this route"). By doing this, sensor cleaning control system 184 can save sensor cleaning fluid (e.g., a half a tank of sensor cleaning fluid) by cleaning sensors 60 once instead of multiple times (e.g., every few minutes) along the stretch of road. In other words, sensor cleaning control system 184 can recommend operation of vehicle 100 in manual mode to reduce excessive sensor cleaning cycles.

Turning again to FIG. 1, interface system 130 includes any linkages and/or components configured to output information or data to a vehicle occupant, such as a driver, and receive inputs or information from the vehicle occupant. In the present example, interface system 130 includes a display unit 190 and an input/output (I/O) 192. Display unit 190 may include any form of conveying information to a user. In some examples, display unit 190 includes a screen or other display that may show visual images such as text, illustrations, graphs, or other information relating to vehicle control system 105 and/or vehicle operation system 115. Display unit 190 may be, include, or be part of multiple display units. For example, in some examples, display unit 190 may include one, or any combination, of a central display unit associated with a dash of vehicle 100, an instrument cluster display unit associated with an instrument cluster of vehicle 100, and/or a heads-up display unit associated with the dash and/or a windshield of vehicle 100. Accordingly, as used herein, the reference numeral 190 may refer to one, or any combination, of the display units. I/O device 192 may be, include, or be part of a communication port (e.g., a USB port), a Bluetooth communication interface, a touch-screen display unit, soft keys associated with the dash, the steering wheel, a keyboard, buttons, scroll wheels, knobs, dials, switches, voice-activated dialogue, and/or or other components enabling the vehicle occupant to input data or information into vehicle control system 105 and/or vehicle operation system 115. Other examples of sub-components that may be part of interface system 130 include, but are not limited to, audible alarms, visual alerts, telecommunications equipment, and computer-related components, peripherals, and systems. In some examples, driver notifications generated by sensor cleaning control system 184 and/or vehicle control system 105 as described herein can be provided to the driver of vehicle 100 via interface system 130. In some examples, a driver notification can include a visual alert on display unit 190 and/or an audio alert via I/O device 192 that recommends an optimal trailing distance and/or switching operation of vehicle 100 to manual mode to preserve sensor cleaning fluid.

The term "system" is meant herein to refer to an agent, instrument, or combination of either, or both, agents and instruments that may be associated to serve a purpose or accomplish a specific task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the specific purpose or task to be accomplished by the system. Accordingly, some of the systems may be software modules or routines, while others of the systems may be hardware and/or equipment elements in communication with any or all of the components of vehicle 100. The present disclosure further contemplates that any of the systems, such as vehicle sensor cleaning system 125, described herein are configured to implement machine learning and/or artificial intelligence (AI) learning to carry out vehicle sensor cleaning operations that optimize vehicle sensor cleaning fluid usage as described herein.

It will be appreciated that arrangements described herein can provide numerous benefits, including one or more of the benefits mentioned herein. For example, arrangements described herein can optimize sensor cleaning fluid usage of a vehicle sensor cleaning system. Arrangements described herein can provide for enhanced communication between the vehicle and a human driver. Arrangements described herein can maximize the amount of time for the driver to increase the level of manual involvement in the operation of the vehicle. Arrangements described herein can improve safety for autonomous vehicles by alerting a human driver of deviations between expected driving scenes and actual driving scenes. Arrangements described herein can also improve safety by taking appropriate safety measures if a driver fails to confirm that he or she is ready to provide an increased level of manual involvement in the operation of the vehicle. Further, arrangements described herein can increase the overall confidence level of vehicle occupants in the autonomous vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality of vehicle 100 and/or sensor cleaning operations.

The systems, components and/or processes described above can be realized in hardware or a combination of hardware and software and can be realized in a centralized fashion in one processing system or in a distributed fashion, for example, where different elements are spread across several interconnected processing systems. Any kind of processing system or other apparatus adapted for carrying out the methods described herein is suited. A typical combination of hardware and software can be a processing system with computer-usable program code that, when loaded and executed, controls the processing system, such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" refers to a non-transitory storage medium. A computer-readable storage medium may be, for example, but not limited to, an electronic, magnetic, optical, electromagnetic, infrared, or semiconductor system, apparatus, or device, or any suitable combination thereof. More specific examples (a non-exhaustive list) of the computer-readable storage medium would include the following: an electrical connection having one or more wires, a portable computer diskette, a hard disk drive (HDD), a solid state drive (SSD), RAM, ROM, EPROM, EEPROM, flash memory, an optical fiber, a portable compact disc read-only memory (CD-ROM), a digital versatile disc (DVD), an optical storage device, a magnetic storage device, or any suitable combination thereof. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language, such as Java™, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects herein can be embodied in other forms without departing from the spirit or essential attributes thereof. Accordingly, reference should be made to the following claims, rather than to the foregoing specification, as indicating the scope of the invention.

What is claimed is:

1. A sensor cleaning system of a vehicle comprising:
    a sensor cleaning fluid delivery system configured to deliver sensor cleaning fluid to a sensor of the vehicle; and
    a sensor cleaning control system in communication with the sensor cleaning fluid delivery system, wherein the sensor cleaning control system is configured to:
        collect sensor cleaning data associated with the sensor,
        determine a target cleanliness level for the sensor based on the sensor cleaning data, wherein the target cleanliness level is less than a maximum cleanliness level that indicates that the sensor is free of contaminate,
        monitor a cleanliness level of the sensor,
        initiate a sensor cleaning operation when the cleanliness level of the sensor is less than an operational cleanliness threshold, wherein the sensor cleaning fluid delivery system delivers sensor cleaning fluid to the sensor during the sensor cleaning operation to clean the sensor to the target cleanliness level,
        correlate a sensor cleaning cycle frequency with a trailing distance of the vehicle based on the sensor cleaning data associated with the sensor, and
        determine an optimal trailing distance for reducing the sensor cleaning cycle frequency.

2. The sensor cleaning system of claim 1, wherein the sensor cleaning control system is configured to determine the target cleanliness level on a per route basis.

3. The sensor cleaning system of claim 1, wherein the sensor cleaning control system is configured to determine the target cleanliness level on a per weather condition basis.

4. The sensor cleaning system of claim 1, wherein the sensor cleaning control system is configured to determine the target cleanliness level based on a time period between sensor cleaning operations, an amount of sensor cleaning fluid used per sensor cleaning operation, a type of the sensor, a location of the sensor relative to the vehicle, a location of the sensor relative to an external environment of the vehicle, or combinations thereof.

5. The sensor cleaning system of claim 1, wherein the sensor cleaning control system is further configured to:
    for a predetermined travel route, determine a first number of sensor cleaning cycles and a first amount of sensor cleaning fluid used to clean the sensor when the vehicle is operated in an autonomous mode for the predetermined travel route; and
    when the first amount of sensor cleaning fluid is greater than or equal to a threshold amount of sensor cleaning fluid, generate a notification that recommends operating the vehicle in manual mode, wherein a second number of sensor cleaning cycles and a second amount of sensor cleaning fluid is used to clean the sensor when the vehicle is operated in the manual mode for the predetermined travel route, wherein the second number of sensor cleaning cycles is less than the first number of sensor cleaning cycles and the second amount of sensor cleaning fluid is less than the first amount of sensor cleaning fluid.

6. The sensor cleaning system of claim 1, wherein the sensor cleaning control system is connected to an adaptive cruise control system of the vehicle and the sensor cleaning control system is further configured to:
    communicate the optimal trailing distance to the adaptive cruise control system, such that the adaptive cruise control system can adjust a current trailing distance of the vehicle to the optimal trailing distance.

7. The sensor cleaning system of claim 1, wherein the sensor cleaning control system is further configured to generate a notification that includes the optimal trailing distance.

8. The sensor cleaning system of claim 1, wherein the vehicle is configured to switch between an autonomous mode and a manual mode to reduce a sensor cleaning fluid usage of the sensor cleaning control system.

9. The sensor cleaning system of claim 1, wherein the sensor is a first sensor, the target cleanliness level is a first target cleanliness level, the operational cleanliness threshold is a first operational cleanliness threshold, the sensor cleaning operation is a first sensor cleaning operation, the vehicle further includes a second sensor, and the sensor cleaning control system is configured to:
    collect sensor cleaning data associated with the second sensor;
    determine a second target cleanliness level for the second sensor based on the sensor cleaning data, wherein the second target cleanliness level is less than the maximum cleanliness level and different than the first target cleanliness level;
    monitor a cleanliness level of the second sensor; and
    initiate a second sensor cleaning operation when the cleanliness level of the second sensor is less than a second operational cleanliness threshold, wherein the sensor cleaning fluid delivery system delivers sensor cleaning fluid to the second sensor during the second sensor cleaning operation to clean the second sensor to the second target cleanliness level.

10. A vehicle comprising:
    a sensor system configured to generate sensor data associated with an external environment of the vehicle;
    an advanced driver assistant system configured to use the sensor data to at least partially assist in navigating the vehicle; and
    a sensor cleaning system commutatively coupled to the sensor system and the advanced driver assistant system, wherein the sensor cleaning system includes:
        a sensor cleaning fluid source, a sensor cleaning fluid delivery system configured to deliver sensor cleaning fluid to sensors of the sensor system, and
a sensor cleaning control system configured to:
collect sensor cleaning data associated the sensors;
determine target cleanliness levels for the sensors based on the sensor cleaning data, wherein the target cleanliness levels are less than a maximum cleanliness level that indicates that the sensors are free of contaminate, and further wherein at least two sensors have different target cleanliness levels;
monitor cleanliness levels of the sensors;
initiate a sensor cleaning operation when a cleanliness level of one of the sensors is less than an operational cleanliness threshold, wherein the sensor cleaning fluid delivery system delivers sensor cleaning fluid to the one of the sensors during the sensor cleaning operation to clean the one of the sensors to a respective target cleanliness level of the target cleanliness levels;
correlate a sensor cleaning cycle frequency with a trailing distance of the vehicle;
determine an optimal trailing distance for reducing the sensor cleaning cycle frequency; and
communicate the optimal trailing distance to the advanced driver assistant system, wherein the advanced driver assistant system is configured to adjust the navigating of the vehicle in response to learning the optimal trailing distance.

11. The vehicle of claim 10, wherein the advanced driver assistant system is configured to decelerate the vehicle to adjust a current trailing distance of the vehicle in response to learning the optimal trailing distance.

12. The vehicle of claim 10, wherein the advanced driver assistant system includes an adaptive cruise control system configured to adjust a current trailing distance of the vehicle in response to learning the optimal trailing distance.

13. A sensor cleaning system of a vehicle comprising:
a sensor cleaning fluid delivery system configured to deliver sensor cleaning fluid to a sensor of the vehicle; and
a sensor cleaning control system in communication with the sensor cleaning fluid delivery system, wherein the sensor cleaning control system is configured to:
collect sensor cleaning data associated with the sensor,
analyze the sensor cleaning data associated with the sensor to identify a sensor cleaning trend associated with the sensor, wherein the analyzing the sensor cleaning data associated with the sensor to identify the sensor cleaning trend associated with the sensor includes correlating a sensor cleaning cycle frequency with a trailing distance of the vehicle,
determine a vehicle operation parameter that reduces the sensor cleaning cycle frequency based on the sensor cleaning trend, wherein the determining the vehicle operation parameter that optimizes a sensor cleaning fluid usage based on the sensor cleaning trend includes determining an optimal trailing distance for reducing the sensor cleaning cycle frequency, and
initiate a vehicle operation action based on the vehicle operation parameter.

14. The sensor cleaning system of claim 13, wherein:
the analyzing the sensor cleaning data associated with the sensor to identify the sensor cleaning trend associated with the sensor further includes correlating sensor cleaning cycle frequency with a predetermined travel route and determining a sensor cleaning fluid usage for the predetermined travel route based on the sensor cleaning cycle frequency; and
the determining the vehicle operation parameter that optimizes sensor cleaning fluid usage based on the sensor cleaning trend further includes determining whether operating the vehicle in manual mode reduces an amount of sensor cleaning fluid used for the predetermined travel route.

15. The sensor cleaning system of claim 14, wherein the initiating the vehicle operation action based on the vehicle operation parameter includes recommending initiation of manual mode of the vehicle to an adaptive cruise control system.

16. The sensor cleaning system of claim 14, wherein the initiating the vehicle operation action based on the vehicle operation parameter includes causing generation of a driver notification to operate the vehicle in manual mode.

17. The sensor cleaning system of claim 13, wherein the sensor cleaning control system is further configured to:
determine a target cleanliness level for the sensor based on the sensor cleaning data, wherein the target cleanliness level is less than a maximum cleanliness level that indicates that the sensor is free of contaminate; and
monitor a cleanliness level of the sensor and initiate a sensor cleaning operation when the cleanliness level of the sensor is less than an operational cleanliness threshold, wherein the sensor cleaning fluid delivery system delivers sensor cleaning fluid to the sensor during the sensor cleaning operation to clean the sensor to the target cleanliness level.

18. The sensor cleaning system of claim 13, wherein the initiating the vehicle operation action based on the vehicle operation parameter includes communicating the optimal trailing distance to an adaptive cruise control system of the vehicle, such that the adaptive cruise control system can adjust a current trailing distance of the vehicle to the optimal trailing distance.

19. The sensor cleaning system of claim 13, wherein the initiating the vehicle operation action based on the vehicle operation parameter includes causing generation of a driver notification including the optimal trailing distance.

* * * * *